United States Patent

[11] 3,609,146

[72] Inventor William J. Houlihan
Mountain Lakes, N.J.
[21] Appl. No. 772,825
[22] Filed Nov. 1, 1968
[45] Patented Sept. 28, 1971
[73] Assignee Sandoz-Wander, Inc.
Hanover, N.J.

[54] SUBSTITUTED BENZODIAZEPINONE DERIVATIVES
5 Claims, No Drawings
[52] U.S. Cl............................................260/239.3 D,
260/562 B, 260/570 A, 424/244
[51] Int. Cl.................................................C07d 53/06
[50] Field of Search........................................... 260/239.3 BD

[56] References Cited
UNITED STATES PATENTS
3,299,053 1/1967 Archer et al.................. 260/239.3
3,371,085 2/1968 Reeder et al.................. 260/239.3

FOREIGN PATENTS
1,343,474 10/1963 France......................... 260/239.3

Primary Examiner—Henry R. Jiles
Assistant Examiner—Robert J. Bond
Attorneys—Gerald D. Sharkin, Frederick H. Weinfeldt, Robert S. Honor, Walter F. Jewell and Richard E. Vila ABSTRACT: The invention concerns benzodiazepinone derivatives of the formula

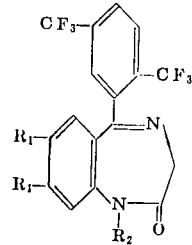

wherein $R_1$ is hydrogen, methyl, or halogen of atomic weight about 19 to 36, and $R_2$ is hydrogen, lower alkyl, or dialkylaminoalkyl, and to processes for their production.

The compounds are useful tranquilizers as indicated by their pharmacological activity in animals.

SUBSTITUTED BENZODIAZEPINONE DERIVATIVES

This invention concerns 5-[bis(trifluoromethyl)phenyl]1,3-dihydro-2H-1,4-benzodiazepin-2-ones, to pharmaceutical compositions comprising them, and to process for their preparation. The invention also concerns intermediates for these benzodiazepin-2-ones. More particularly, this invention relates to benzodiazepinone derivatives of the formula

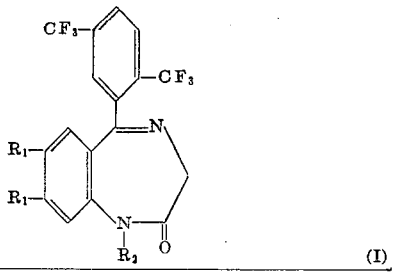

(I)

and pharmaceutically acceptable acid addition salts thereof, wherein each of the symbols $R_1$ is hydrogen, methyl, or halogen of atomic weight about 19 to 36, and $R_2$ is hydrogen, straight or branched chain lower alkyl of 1 to 3 carbon atoms, e.g., methyl, ethyl or propyl, or

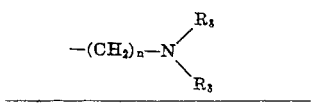

wherein
n is 2 or 3 and each of the symbols $R_3$ is straight chain lower alkyl of 1 to 3 carbon atoms, as above exemplified.

A process for the production of a compound I, may be represented by the following general reaction scheme:

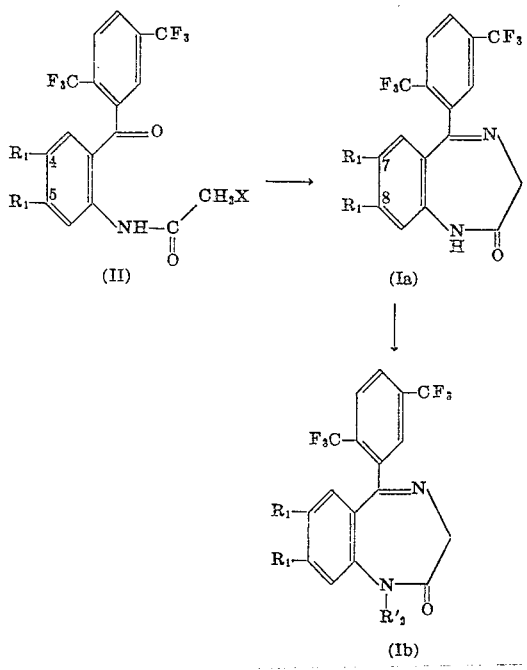

In the formulas shown in the above reaction scheme, the symbols $R_1$ have the above-mentioned significance, $R'_2$ has the same significance as $R_2$ with the exception that hydrogen is excluded, and X is chlorine or bromine. The compounds of formula Ia are the compounds of formula I wherein $R_2$ is hydrogen, and the remaining compounds of formula I are defined by the compounds of Ib.

The compounds of IIa are prepared by cyclizing the 2-halo-2'[2,5-bis(trifluoromethyl)benzoyl]-acetanilde compound of formula II with liquid ammonia. Solvents such as diethyl ether may be used but it is convenient to use excess ammonia as solvent. The reaction may be carried out at a temperature of about −70° to −20° C. preferably at the reflux temperature of the system, for about 5 to about 35 hours.

The compounds of formula Ib are prepared by alkylating in solvent the amide nitrogen atom of 5-[2,5-bis(trifluoromethyl)phenyl]fq1,3-dihydro-2H-benzodiazepin-2-one of formula Ia with compound of formula $R'_2X$, where X is as previously defined. The reaction is carried out in solvent such as toluene, and in the presence of both an alkali metal hydride, preferably sodium, hydride, and a diloweralkylamide such as diethylacetamide or dimethylformamide under anhydrous condition. The reaction may be carried out at a temperature of from about 25° to about 150° C., preferably under reflux, for about from 2 to 6 hours.

The compounds of formula II mentioned above are prepared according to the following reaction scheme:

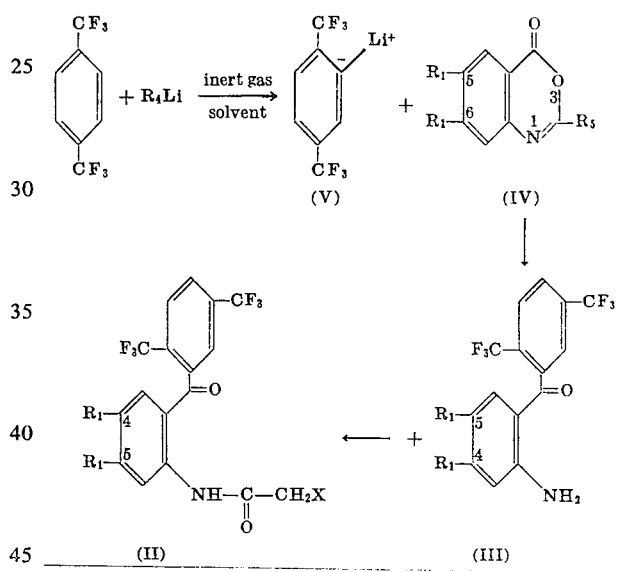

where $R_1$ and X are as defined above, $R_4$ represents straight chain lower alkyl, of 1–6 carbon atoms, e.g. methyl, ethyl, propyl, and pentyl, and $R_5$ is straight chain lower alkyl of 1–4 carbon atoms, such as methyl, ethyl and butyl.

An alkyl lithium compound, preferably n-butyl lithium, as shown, is treated with 1,4-bis(trifluoromethyl)benzene to produce the lithium 1,4-bis(trifluoromethyl)benzene compound of formula V. The reaction is carried out in a suitable solvent, and in an inert gas atmosphere such as nitrogen. Suitable solvents include benzene, hydrocarbons such as pentane, hexane, cyclohexane, and heptane, and ethers such as diethyl ether, dibutyl ether, and tetrahydrofuran. The reaction may be carried out at a temperature between about −15° C. and 45° C., conveniently at between 15° C. and 25° C. The compound of formula V is then treated in solvent with a 2-alkyl-(preferably methyl) 4H-3,1-benzoxazin-4-one of formula IV to produce a 2-amino-2',5'-bis(trifluoromethyl)benzophenone of formula III. This reaction is preferably effected by careful addition of the lithium compound of formula V to a solution of the benzoxazine IV. Suitable solvents include a methylene chloride-ether solvent. The ethers used may be diethyl ether, dibutyl ether, tetrahydrofuran, dioxane and the like. Other solvents such as hydrocarbons may also be present. The reaction may be carried out at a temperature between 20° C. to 35° C. preferably for about 10 to 25 hours.

A 2-amino-2',5'-bis(trifluoromethyl)benzophenone, 5'-bis(triflooromethyl)benzophenone of formula III is treated in inert organic solvent with 2-chloro-or 2-chloro- or2-bromoacetyl bromide or chloride to produce an acetanilide of formula II. This step may be carried out in such solvents as benzene, pyridine, tetrahydrofuran, or chloroform, preferably a mixture of benzene and pyridine, at a temperature between about 25° to about 125° C., for about one-half an hour to about 25 hours.

The compounds of formulas II and III are new and novel and they and the processes for their preparation described above also form part of the present invention. The compounds of formula Ia, Ib, II and III obtained in the various reactions described above may be isolated and purified in conventional manner. It is furthermore to be appreciated that in the various processes described above, factors such as the solvents and temperatures employed are not critical. When the compounds of formula I are obtained as acid addition salts and it is desired that they be separated as the free base, this may be accomplished in a conventional manner, such as by dissolving the salt and treating the solution with sodium carbonate.

The 1,4-bis(trifluoromethyl)benzene employed in the preparation of compound V is known and may be prepared by methods disclosed in the literature. Additionally, some of the compounds of formula IV are known and are prepared according to methods disclosed in the literature. Those of the compounds of formula IV not specifically disclosed may be prepared from known materials employing analogous methods.

The compounds of formula I are useful because they possess pharmacological activity in animals. More particularly, the compounds are useful as tranquilizers, as indicated by the anticonvulsant, hexobarbital reinduction and amphetamine antagonism properties shown in mice. The anticonvulsant activity of the active material in mice is assessed by its ability to inhibit electrically induced convulsions at dosages of 50 and 100 mg./kg. i.p. employing the method of Toman et al. (J. Neurophysiol., 9: 231, 1946). The hexobarbital reinduction in mice is determined by investigating the effect of the active material on hexobarbital anesthesia, the active material being administered at a dosage of 100 mg./kg. i.p. immediately after the administration hexobarbital, Dinter (J. Pharmacol. & Exp. Therap. 94, 7, 1948). The amphetamine antagonism properties of active material are tested by administering to mice dosages of 25 and 50 mg./kg. i.p. of active material together with 2.5 mg./kg. of amphetamine sulfate, and then evaluating the locomotor activity of the mice with the aid of an Actophotometer.

When utilized as described, the compounds may be combined with one or more pharmaceutically acceptable carriers or adjuvants. They may be administered orally or parenterally and, depending upon the compounds employed and the mode of administration, the exact dosage utilized may vary. Furthermore, the compounds (I) may be similarly administered in the form of their nontoxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benezenesulfonate, and the like. In general, satisfactory results are obtained when these compounds are administered at a daily dosage of about 5 milligrams to about 100 milligrams per kilogram of animal body weight. This daily dosage is preferably administered 2 to 4 times a day, or in sustained release form. For most large animals such as primates, the total daily dosage is from about 350 milligrams to about 1000 milligrams. Dosage forms suitable for internal use comprise from about 100 milligrams to about 500 milligrams of the active compound in intimate admixture with a solid or liquid pharmaceutically acceptable carrier or diluent.

A representative formulation suitable for oral administration is a tablet prepared by standard tabletting techniques which contains the following:

| Ingredients | Parts by Weight |
| --- | --- |
| 5-[2,5-bis(trifluoromethyl)phenyl]-1,3-dihydro-2H-1,4-benzodiazepin-2-one | 40 |
| tragacanth | 40 2 |
| lactose | 49.5 |
| corn starch | 5 |
| talcum | 3 |
| magnesium stearate | 0.5 |

The following examples are provided for the purpose of illustration and not by way of limitation. They are not intended to limit the scope of the invention as defined in the appended claims.

EXAMPLE 1

5-[2.5-bis(trifluoromethyl)phenyl]-1,3-dihydro-2H-1,4-benzodiazepin-2-one a. 2-Amino-2',5'-bis(trifluoromethyl)benzophenone To -bis(trifluoromethyl)benzene flask equipped with a stirrer, dropping funnel, condenser and gas inlet tube there was added 21.4 g. (0.10 mole) of 1,4-bis(trifluoromethyl)enzene and 100 ml. of dry ether. The system was blanketed with nitrogen and 75 ml. of n-butyllithium (15 percent hexane; 0.12 mole) was added dropwise with stirring at room temperature. After an additional 1 hour at room temperature the solution was transferred under nitrogen to a dropping funnel and then added with stirring, during 1.5 hours, to a solution of 23.4 g. (0.12 mole) of 2-methyl-4H-3,1-benzoxazen-4-one in 25 ml. of dry methylene chloride. The solution was stirred at room temperature for 15 hours and then poured onto 35 g. of ammonium chloride in ice-water. The system was extracted three times with 250 ml. of ether and the combined ether layer was concentrated in vacuo. The residue (42.2 g.) was dissolved in 250 ml. ethanol and 250 ml. of 2N NaOH and refluxed for 1 hour. The solution was concentrated in vacuo to about one-half volume and then extracted three times with 100 ml. of methylene chloride. The methylene chloride was dried, filtered and concentrated in vacuo. The residue was crystallized from pentane to give the title compound m.p. 80–82°A C.

When the above process is carried out and 6-chloro-2-methyl-4-H-3,1-benzoxazin-4-one, or 2,5-dimethyl-4H3,1-benzoxazin-4-one is used in place of 2-methyl-4H-3,1-benzoxazin-4-one, there is obtained 2-amino-4-chloro-2', 5'-bis(trifluoromethyl)benzophenone; b.p. 145° C. at 0.5 mm. Hg, or 2-amino-5-methyl-2',5'-bis(trifluoromethyl)benzophenone, respectively.

b. 2-Bromo-2'-[2,5-bis(trifluoromethyl)benzoyl]acetanilide.

To a flask equipped with a stirrer, dropping funnel and condenser there was added 5.0 g. (0.015 mole) of 2-amino-2',5'-bis(trifluoromethyl)benzophenone, 1.53 ml. (0.019mole) of dry pyridine and 50 ml. of dry benzene. The solution was stirred and treated with 3.64 g. (0.018 mole) of 2-bromoacetyl bromide and then refluxed for 0.5 hour. The benzene solution was then washed twice with 50 ml. of water and twice with 50 ml. of 2N hydrochloric acid, dried with magnesium sulfate, filtered and concentrated in vacuo. The residue was crystallized from ether-pentane to give the title compound; m.p. 109–112° C.

In a similar manner the 2-amino-2'2-amino-2',5'-bis(trifluoromethyl)benzophenone compounds mentioned under (a) above are respectively treated with 2-bromoacetyl bromide to produce 2-bromo-5'-chloro-2'- [2,5-bis(trifluoromethyl)benzoyl]acetanilide. and 2-bromo-4'-methyl 2'-[2,5-bis(trifluoromethyl)benzoyl]acetanilide. [2,5-bis(trifluoromethyl)phenyl]-1,3-dihydro-2H-1,4benzodiazepin-2-one To a flask equipped with a magnetic stirring bar, gas inlet tube and a dry ice condenser filled with an acetone-dry ice slurry there was added 13.7 g. of 2-bromo-2'-[2,5-bis(trifluoromethyl)benzoyl]acetanilide. The flask was immersed in a dry ice-acetone bath and ca. 100 ml. of dry ammonia was condensed in the flask. The mixture was stirred and refluxed for 5 hours and then the dry-ice acetone bath and condenser were removed. After the ammonia had evaporated, the residue was treated with 50 ml. of water and 150 ml. of chloroform. The chloroform layer was washed with water, dried with magnesium sulfate, filtered and concentrated in vacuo. The residue was chromatographed on a silica gel column and eluted with benzene-chloroform (50:50) to give the title compound; m.p. 280° C.

The 8-chloro-, and 7-methyl derivatives of 5-[2,5-bis(trifluoromethyl)phenyl]f-1,3-dihydro-2H-1,4-benzodiazepin-2-one are prepared in s similar manner by respectively treating with liquid ammonia the acetanilide compounds mentioned under (b) above.

EXAMPLE 2

1-(2-Dimethylaminoethyl)-5-[1,5-bis(trifluoromethyl)phenyl]-1,3-dihydro-2H-1,4-benzodiazepin-2-one dihydrochloride To a flask equipped with a stirrer, dropping funnel, condenser and gas inlet tube there was added, under nitrogen, 10 ml. of dry dimethylformamide, 20 ml. dry toluene, 1.50 g. (0.004 mole) of 5-[2,5-bis(trifluoromethyl)phenyl]-1,2-dihydro-2H-1,4-benzodiazepin-2-one obtained as in Example 1c), and 0.182 g. of sodium hydride-mineral oil suspension (55 percent, NaH; 0.004 mole). After stirring for 0.5 hours at room 0.54 the solution was treated with 0.54 g. (0.005 mole) of 2-dimethylaminoethyl chloride in 10 ml. of dry toluene. The mixture was refluxed for 4 hours and then concentrated in vacuo. The residue was extracted with 50 ml. of IN hydrochloric acid and 25 moles of ether. The acid layer was neutralized with 2N sodium hydroxide and extracted with methylene chloride, dried filtered, and concentrated to give the oily free base. The oil was dissolved in ether and treated with dry hydrochloric acid to give the title compound, m.p. ca. 100° C.

EXAMPLE 3

1-(3-pimethylaminopropyl)5[2,5-bis(trifluoromethyl)phenyl]-1,3-dinydro-2H-1,4-benzodiazepin-2-one dihydrochloride In a manner similar to that described under example 2, but employing 3-dimethylaminopropyl chloride in the reaction in place of 2-dimethylaminoethyl chloride, the title compound was produced m.p. ca. 100° C. (hygroscopic).

EXAMPLE 4

1-Methyl-5-[2,5-bis(trifluoromethyl)phenyl]-dihydro-2H-1,4-benzodiazepin-2-one

In a manner similar to that described under example 2, but employing methyl bromide in the reaction in place of 2-dimethylaminoethyl chloride, the title compound was produced; m.p. 143–145° C.

In a similar manner, the compounds 1-ethyl; 1-propyl, and 1-isopropyl-5-(2',5'-bis-trifluoromethylphenyl)1,3-dihydro-2H-1,4-benzodiazepin-2-one are produced by reaction with the appropriate alkyl chloride or bromide.

What is claimed is:

1. A benzodiazepinone of the formula

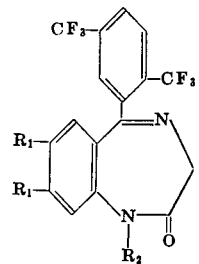

wherein each of the symbols $R_1$ is hydrogen, methyl or halogen of atomic weight about 19 to 36, and $R_2$ is hydrogen, lower alkyl, or

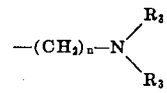

wherein $n$ is 2 or 3, and each of the symbols $R_3$ is lower alkyl, or a pharamaceutically acceptable acid addition salt thereof.

2. A benzodiazepinone according to claim 1 which is 5[-2,5-bis(trifluoromethyl)]phenyl-1,3-dihydro-2H-1,4-benzodiazepin-2-one or a a pharmaceutically acceptable acid addition salt thereof.

3. A benzodiazepinone according to claim 1 which is 1-(2-dimethylaminoethyl-5-[2,5-bis(trifluoromethylphenyl]-1,3-dihydro-2H-1,4-benzodiazepin-2-one or a pharmaceutically acceptable acid addition salt thereof.

4. A benzodiazepinone according to claim 1 which is 1-(3-dimethylaminopropyl)-5-[2,5-bis(trifluoromethyl)phenyl]-1,3-dihydro-2H-1,4-benzodiazepin-2-one or a pharmaceutically acceptable acid addition salt thereof.

5. A benzodiazepionone according to claim 1 which is 1-methyl-5-[2,5-bis(trifluoromethyl)phenyl]-1,3-dihydro-2H-1,4-benzodiazepin-2-one or a pharmaceutically acceptable acid addition salt thereof.